US012643257B2

(12) United States Patent
Piasentin

(10) Patent No.: US 12,643,257 B2
(45) Date of Patent: Jun. 2, 2026

(54) ASSEMBLING MACHINE AND METHOD

(71) Applicant: TECNO LOGICA S.R.L., Spresiano (IT)

(72) Inventor: Mirko Piasentin, Spresiano (IT)

(73) Assignee: TECNO LOGICA S.R.L., Spresiano (IT)

( * ) Notice: Subject to any disclaimer, the term of this patent is extended or adjusted under 35 U.S.C. 154(b) by 365 days.

(21) Appl. No.: 18/271,454

(22) PCT Filed: Jan. 21, 2022

(86) PCT No.: PCT/IB2022/050503
§ 371 (c)(1),
(2) Date: Jul. 9, 2023

(87) PCT Pub. No.: WO2022/162509
PCT Pub. Date: Aug. 4, 2022

(65) Prior Publication Data

US 2024/0066751 A1 Feb. 29, 2024

(30) Foreign Application Priority Data

Feb. 1, 2021 (IT) ........................ 102021000001997

(51) Int. Cl.
*A47B 88/90* (2017.01)
*B27M 3/18* (2006.01)

(52) U.S. Cl.
CPC ............ *B27M 3/18* (2013.01); *A47B 88/941* (2017.01)

(58) Field of Classification Search
CPC ............................... B27M 3/18; A47B 47/042
See application file for complete search history.

(56) References Cited

FOREIGN PATENT DOCUMENTS

| | | | | | |
|---|---|---|---|---|---|
| DE | 19619605 | A1 | | 11/1996 | |
| DE | 19903358 | C1 | * | 3/2000 | B27M 3/18 |
| DE | 10318539 | B3 | * | 12/2004 | B27M 3/18 |

OTHER PUBLICATIONS

English translation DE19903358 (Year: 2000).*
International Search Report for PCT/IB2022/050503 Mailed Apr. 21, 2022.

* cited by examiner

*Primary Examiner* — Jason L Vaughan
*Assistant Examiner* — Amanda Kreiling
(74) *Attorney, Agent, or Firm* — Rivka Friedman

(57) ABSTRACT

An improved method for producing via a machine an assembled furniture item such as a drawer or box-shaped enclosure from individual panels is described. The method has the steps of holding a first and second panel so that these panels are spaced and parallel to each other;

holding a third and fourth panel, in close proximity to the first and second panels, so that the third and fourth panels are spaced apart, parallel to each other, and on planes orthogonal to the lying planes of the first and second panels, and moving the first and/or second panel and/or third and fourth panels so that the edges of the first, second, third and fourth panels contact each other forming the drawer or box-shaped enclosure.

20 Claims, 9 Drawing Sheets

ASSEMBLING MACHINE AND METHOD

TECHNICAL FIELD

The present invention relates to an assembly method for producing an assembled furniture item (also referred to as a cabinet), or an assembled box-shaped portion of furniture, such as a drawer, starting from individual panels. The present invention also relates to an assembly machine, and an industrial plant or facility comprising the machine. The machine or plant is for producing according to the method an assembled furniture item (also called cabinet), or an assembled box-shaped portion of furniture, such as a drawer, starting from individual panels.

BACKGROUND

The well-known industrial plants for the mass production of assembled furniture, taken here as an example, consist of one or more independent lines on which various machining operations (drilling, milling . . . and assembly operations) are carried out. Each line is characterized by a series of loading bays having pallets from which panels are picked up and then processed individually in a sequential manner. As they pass through, the panels stop at various work stations where they are processed and/or pre-assembled; see e.g. DE102007040386A1, DE102007035743A1 or DE102006036193A1.

The final assembly of the panels to compose the furniture item takes place at the end of the line in a station (the so-called "neck") fed manually with the last pieces.

Not only is this station complex and very voluminous, but also—and more importantly—slow, i.e. with low hourly production.

SUMMARY

The primary object of the invention is to improve upon the present state of the art.

Another object of the invention is to make a machine or industrial plant for producing an assembled furniture item, or an assembled portion of furniture such as a drawer or box-shaped casing, starting from individual panels.

Another object of the invention is to make an industrial machine or plant for producing an assembled furniture item with high hourly output.

These and other objects are achieved by what is set forth in the attached claims; advantageous technical features are defined in the dependent claims.

An aspect of the invention is a method for producing by means of a machine an assembled furniture item, or an assembled portion of furniture item such as a drawer or box-shaped casing, starting from individual panels, comprising the steps of

- holding a first and second panel so that such panels are spaced apart and parallel to each other;
- holding a third and fourth panel, in close proximity to the first and second panels, so that the third and fourth panels are spaced apart, parallel to each other, and on planes orthogonal to the lying planes of the first and second panels,
- moving, e.g. by only linearly translating, at least one panel towards the others so that the edges of the first, second, third and fourth panels end up contacting each other thereby forming the drawer or box-shaped casing.

In particular, the method envisages moving, e.g. by translating only linearly, the first and/or second panel and/or third and/or fourth panel so that the edges of the first, second, third and fourth panels end up contacting each other thereby forming the drawer or box-shaped casing.

In this way it is possible to industrialize and build quickly and precisely a box-shaped shell with the panels.

In a preferred embodiment of the method, in order to form a complete drawer or box-shaped casing, a fifth panel is held so that the latter is in close proximity, and on a plane orthogonal to the lying planes of the first, second, third and fourth panels, and the fifth panel is moved toward the other panels so that the edges of the fifth panel end up or are in contact with the edges of the first, second, third, and fourth panels forming the drawer or box-shaped casing.

The relative displacement of the panels to bring their edges into contact may involve various trajectories, such as a combination of linear and/or curved displacements for a or each panel. In particular, to simplify the assembly and bring the edges of the panels into contact, the method envisages the steps of

- holding the panels so that they form in exploded view a drawer structure or a box-shaped casing, and then
- bringing the panels closer together, e.g. by translating only linearly, towards a same imaginary point inside the space surrounded by the panels.

Specifically, the method envisages moving at least the first, second, third and fourth panel, and optionally the fifth panel, so that they converge to a common point to form the drawer or box-shaped casing.

The contacting edges of the panels can then be fixed relatively to each other by external means or interlocked (e.g. via interlocks between male-female portions of the panels), the contact between the edges then being sufficient.

In a preferred embodiment of the method, in order to form a more accessorized drawer or box-shaped casing, a sixth panel is held so that the latter, during the assembly steps, stays

- between the first and second panel and/or between the third and fourth panel,
- on a plane parallel to the lying planes of the first and second panel or the lying planes of the third and fourth panel, and
- aligned with the first and second panel or aligned with the third and fourth panel.

Thus, after the composition of the first, second, third and fourth panel, in the assembled cabinet the sixth panel constitutes a horizontal shelf or a vertical internal partition.

Another aspect of the invention is a machine, e.g. numerically controlled (CNC) or controlled via PLC, for producing an assembled furniture item, or an assembled portion of furniture item such as a drawer or box-shaped casing, starting from individual panels.

The machine is capable of performing the abovementioned method and comprises:

- a first and second panel support which
  - are mounted linearly movable along a first displacement direction, and
  - comprise means (or being configured) for holding a first and second panel so that said panels stay spaced apart and parallel to each other;
- a third and fourth panel support, which
  - are mounted linearly movable along a second direction of displacement that is parallel to a plane orthogonal to the first direction, and
  - comprise means (or being configured) for holding a third and fourth panel so that such panels stay spaced apart from each other, parallel to each other, and in proximity to, and on planes orthogonal to the lying planes of, the first and second panel;

a control unit configured for controlling a displacement of the supports so as to move along the first direction the first and second support, and move the third and fourth support along the second direction so that the edges of the first, second, third and fourth panels end up contacting each other to form the drawer or box-shaped casing.

In this way it is possible to industrialize and build quickly and precisely a box-shaped shell with the panels.

The control unit may be made with different technologies, e.g. by using analog and/or digital electronics.

In a preferred embodiment, which simplifies the machine, the first and second panel supports are mounted linearly movable along a same axis, and/or the third and fourth panel supports are mounted linearly movable along a same axis.

In a preferred embodiment, in order to form a complete drawer or box-shaped casing, the machine comprises:

means (or a support) to hold a fifth panel so that the latter stays on a plane orthogonal to the lying planes of the first, second, third, and fourth panels, and optionally is movable along an axis orthogonal to the lying planes of the first, second, third and fourth panels;

and the control unit is configured to control the means (or the support) for holding the fifth panel so that the edges of the fifth panel end up or stay in contact with the edges of the first, second, third, and fourth panels thereby forming the drawer or box-shaped casing.

In a preferred embodiment, which simplifies the machine, the supports are configured for holding the panels so that they form in exploded view the structure of the drawer or a box-shaped casing, and the control unit is configured for controlling a displacement of the supports so as to move the panels closer to one same imaginary point located within the space surrounded by the panels to form the drawer or box-shaped casing. For example, said point may be the center of gravity of the assembled drawer or box-shaped casing.

In a preferred embodiment, simple yet effective, the first and/or second and/or third and/or fourth panel support comprise two arms which are parallel to each other, lying on a plane orthogonal to the respective displacement direction, and equipped with said means for holding or configured to hold the respective panels.

In a preferred embodiment, said two arms are mounted movable within their lying plane, in particular translatable within their lying plane while always remaining parallel to each other (i.e. being able to get closer or move away from each other while always remaining parallel to each other).

In a preferred embodiment, the machine comprises two or three platforms that are movable along a same direction (e.g. the first axis) while remaining parallel to each other, and each equipped with two center arms and two outer arms, the arms being parallel to each other and preferably substantially coplanar, set side by side to form a four-pronged fork, and movable independently, e.g. within their lying plane (which is orthogonal to said direction), being able to get closer or move away from each other while always remaining parallel to each other.

The version with at least three platforms makes it possible to create a cabinet with at least one horizontal internal shelf or one vertical internal septum, the two center arms comprising means (or being configured) for holding the first and second panels so that these panels stay spaced apart and parallel to each other;

and the two outer arms comprising means (or being configured) for holding the third and fourth panels so that such panels stay spaced apart, and parallel to each other, and on planes orthogonal to the first and second panel lying planes.

This structure allows for large degrees of freedom and adaptation to various panel formats despite being simple to construct.

In a preferred embodiment, said means for holding a panel are suction cups or grippers.

In a preferred embodiment, a or each arm comprises means for holding a panel, such as suction cups or grippers.

In a preferred embodiment, the means for holding are mounted on the center arms of each platform so as to face each other. Thus, it is possible to temporarily fix the third and fourth panels within them, where they little impede the other panels during processing. However, the holding means can also be mounted on the central arms of each platform so that they face opposite directions.

For the same, reason, in a preferred embodiment, the holding means are mounted on the outer arms of each platform so as to face each other. However, the holding means may also be mounted on the outer arms of each platform so as to face opposite directions.

In a preferred simple embodiment, the means for holding the fifth panel are mounted on a platform, particularly at the free ends of one or each of the four arms of one or each of the platforms. This position eases the coupling of the fifth panel to the other four.

In a preferred embodiment, which obtains a mounted and accessorized cabinet, the machine comprises an organ that is movable along a third displacement direction (or a third axis) orthogonal to a plane that contains the second displacement direction (or said second axis) and is parallel to the first displacement direction (or said first axis), and comprises means (or being configured) for holding an accessory to be mounted on the fifth panel, and the control unit is configured for moving along the third direction said organ so that the accessory contacts the surface of the fifth panel.

In a preferred embodiment, which simplifies the handling of the panels during the closing, the organ movable along the third displacement direction is mounted on one chosen from: said first, second, third or fourth panel support or the means for holding the fifth panel. In particular, the organ movable along the third displacement direction is mounted at the free ends of one or each of the four arms of one or each platform.

In a preferred embodiment, the machine comprises a table rotatable about a fourth axis (preferably parallel to the first direction), on the periphery of the table being installed with polar symmetry two or more panel-receiving units, each unit comprising said first, second, third and fourth panel supports and preferably also the means for holding the fifth panel. This solution allows an efficient progressive loading of the panels onto the machine.

In a more preferred embodiment, each of the two or more panel-receiving units comprises two platforms as defined above.

In a preferred embodiment, the machine comprises loading means, such as anthropomorphic robots or manipulators, for loading a panel onto said first, second, third and fourth panel supports and on the means for holding the fifth panel.

In a preferred embodiment, the machine comprises an applicator of fastening means for locking the mutual position of the first, second, third, fourth and fifth panels after their edges have been brought into contact.

Preferably, the panels are held in a suspended position to facilitate their movement through space.

For the same reason, and to avoid accidental knocks or impacts between panels during the panel handling, it is advisable for both the method and the machine to move all the panels from a position or exploded configuration to the assembly position. However, it is not necessary to move all the panels, since, for example, it is possible to move only the first and second panels closer to the third and fourth panels, which are always kept fixed; or, for example, it is possible to move only one panel to a casing already formed by the other panels.

In all aspects of the invention, one can adopt as general variants:

- loading the panels sequentially onto a rotary table (with radial feed); and/or
- loading the panels in sequence onto an organ that holds them all "hanging" and "suspended" to then assemble them by collapsing them towards a common center.

BRIEF DESCRIPTION OF THE DRAWINGS

Further advantages will become clear from the following description, which relates to an example of a preferred machine embodiment in which.

DETAILED DESCRIPTION

Equal numbers in figures indicate equal or substantially equal parts. To avoid crowding the drawings, sometimes equal elements are not numbered.

A manipulating machine MC1 (FIG. 1) comprises at least two platforms 10 that are movable along a same (e.g. vertical) axis Y1 while remaining parallel to each other.

Figure 1:
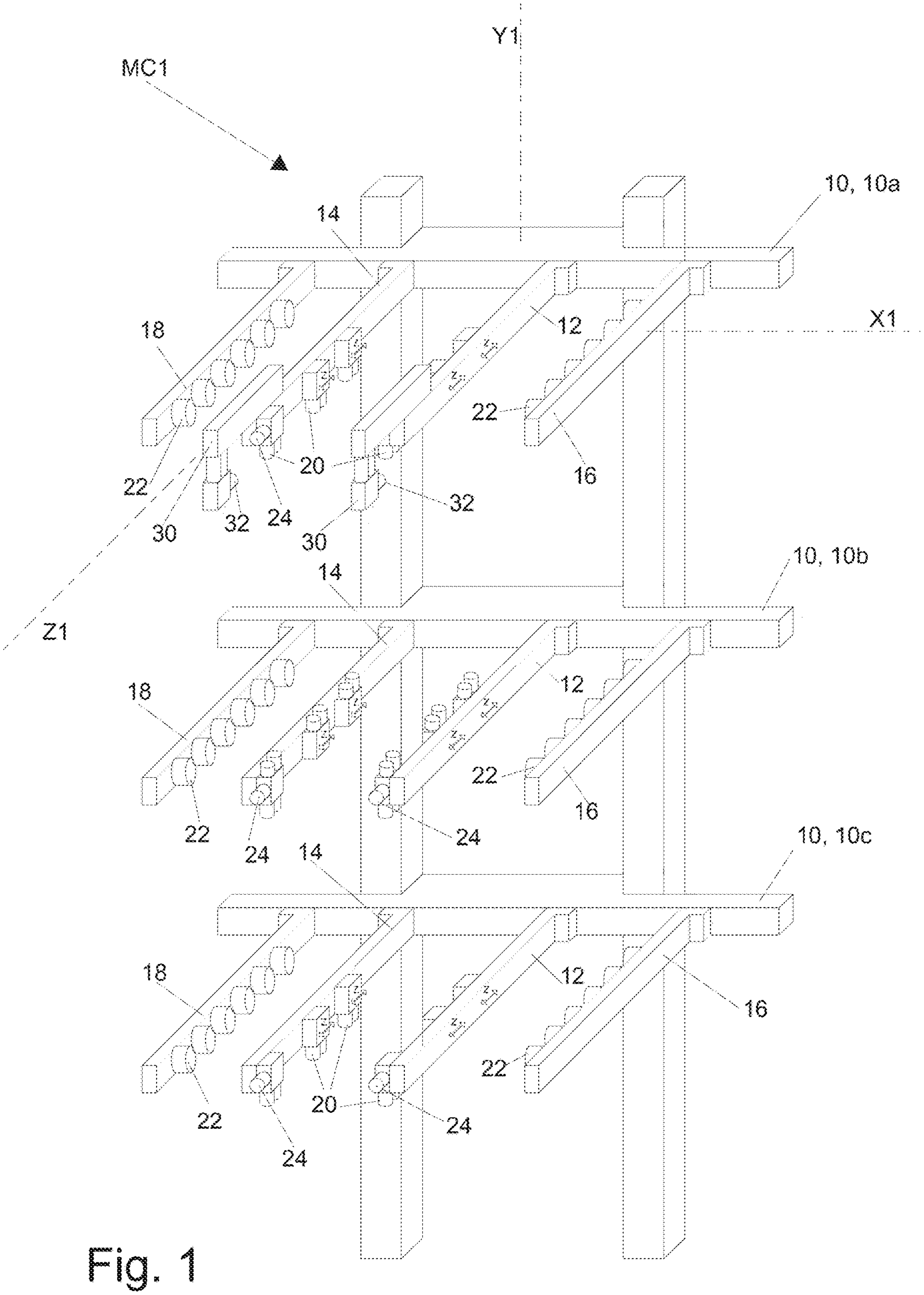
FIG. 1 shows a detail of the machine.

Each platform 10 is provided with two center arms 12, 14 and two outer arms 16, 18, which are all parallel to each other and placed side-by-side to form a four-pronged fork. The arms 12. 14, 16. 18 are mounted on the platform 10 in a movable manner independently of each other, so that they can move within their lying plane (which is orthogonal to the axis Y1) by approaching or moving away from each other while always remaining parallel to each other. In FIG. 1 the arms 12, 14, 16. 18 are translatable along a horizontal axis X1.

The two central arms 12, 14 comprise suction cups 20 for holding a first and second panel 90, 92, respectively, so that these panels stay parallel to each other and spaced apart along the axis Y1. The first and second panels 90, 92 correspond to the top and bottom of the cabinet to be produced.

The two outer arms 16, 18 comprise suction cups 22 for holding a third and fourth panel 94, 96, respectively, so that these panels stay spaced apart along the axis X1, parallel to each other and on planes orthogonal to the lying planes of the first and second panels 90, 92. The third and fourth panels 94, 96 correspond to the sides of the cabinet to be manufactured.

Other suction cups 24 are mounted at the free ends of the arms 12, 14 so as to hold therein a fifth panel 98, corresponding to the back of the cabinet to be produced. The fifth panel 98 remains on a plane orthogonal to the planes of the other four panels.

Preferably, an organ or carriage 30 is mounted on at least one of the arms 12, 14 and is movable along an axis Z1 orthogonal to a plane that contains the axis X1 and is parallel to the axis Y1. The organ 30 comprises suction cups 32 facing the platform 10 for holding an accessory to be mounted on the fifth panel 98, e.g. rails, reinforcing strips, or hardware. Preferably, for added stability, a said organ or carriage 30 is mounted on the arms 12 and 14 of the same platform 10, cooperating in parallel.

A control unit (not shown) is configured or programmed to control and coordinate the movement of the platforms 10, their arms 12, 14, 16, 18, the organ 30, and the state of the suction cups 20, 22, 24.

The example of FIG. 1 shows three platforms 10. For the central platform 10 the arms 12, 14 may be absent, or present and serve to mount an interior shelf of the cabinet. In this case, the suction cups 20 are above and/or under the arms 12, 14.

Figure 2:
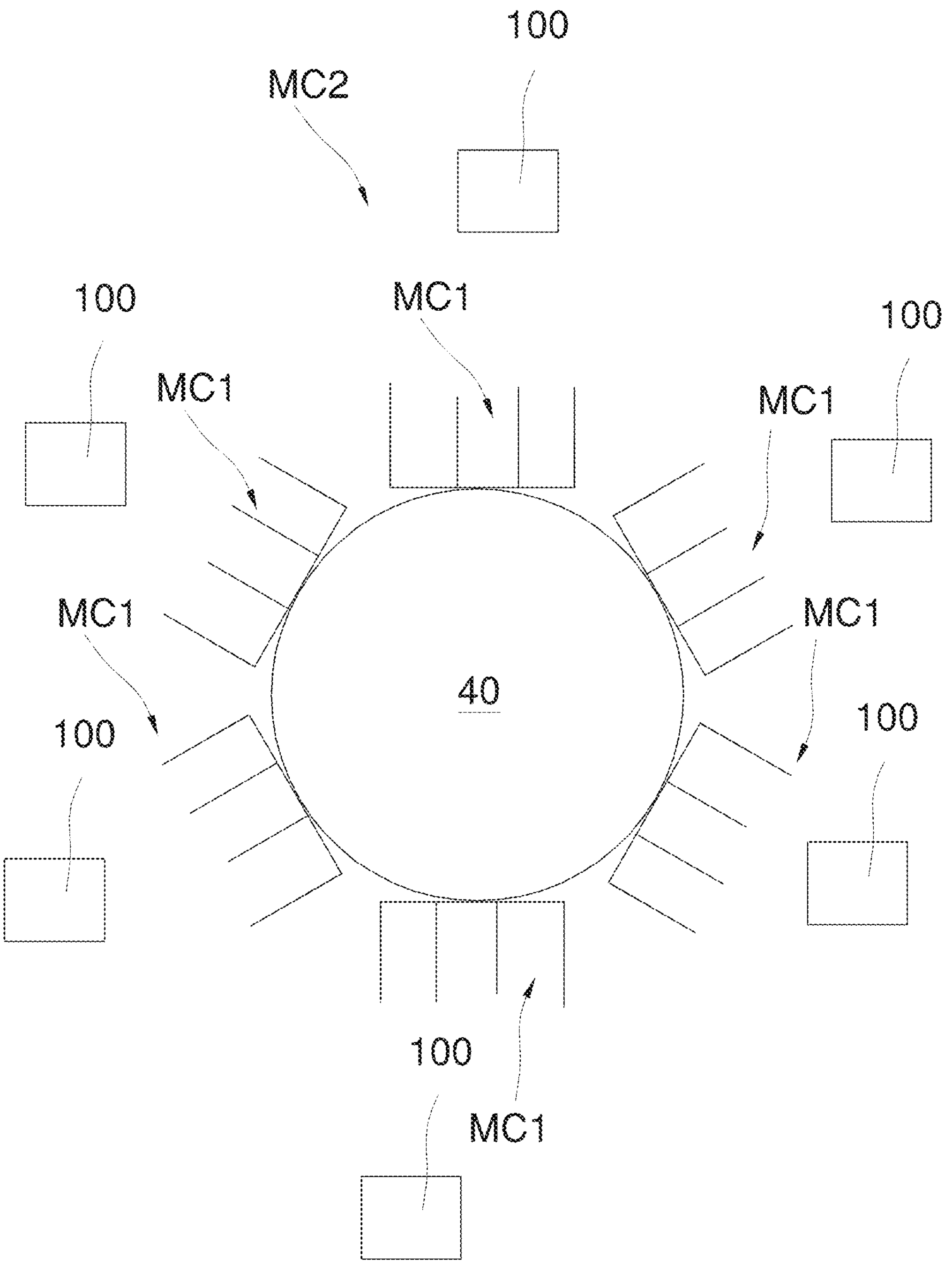
FIG. 2 shows a schematic diagram of a second machine.

Although the machine MC1 could well work on its own, it is preferable to increase the efficiency of the system by making a more sophisticated machine MC2 (see FIG. 2) obtained by replicating the machine MC1 in two or more specimens and mounting them, e.g. with polar symmetry, as an autonomous receiving unit on the periphery of a table 40 revolving about an axis Y2 (preferably parallel to the axis Y1).

Thus, it is possible to implement an efficient progressive loading of the panels 90, 92, 94, 96, 98 onto the overall machine MC2 by means, for example, of robots 100 arranged around the machine MC2 that sequentially feed a or each of the receiving units MC1.

The following description will refer to the case of a machine MC2 with six units or stations MC1 on board (the machine MC2 can however have a different number of units or stations MC1). Below is the function of the six stations:

- 1st station: receiving of panels 90 and 92,
- 2nd station: receiving of stiffening strips,
- 3rd station: receiving of panels 94, 96;
- 4th station: receiving of panel 98,
- 5th station: positioning of panels 90 and 92, stiffening strips (if present), panels 98, 94, 96 and closing of the cabinet; mutual fixing of panels 90, 92, 94, 96, 98 (e.g. by means of adhesives or seaming of panel 98) and drilling of holes (optional) for feet on panel 92,
- 6th station: nailing (optional) protective battens on the bottom of the closed cabinet and unloading the cabinet.

The operation of the machine MC2 is as follows (see FIGS. 3-9).

A station MC1 (FIG. 3) is loaded with the panels 90 and 92 by a robot. The panel 90 is attached to the suction cups 20 under the arms 12, 14 of the upper platform 10, while the panel 92 is attached—mirror-like—to the suction cups 20 above the arms 12, 14 of the lower platform 10.

It is understood that the arms 12, 14 of the upper and lower platforms 10 maintain the panels 90, 92 parallel and spaced apart, and with the edges aligned in a direction parallel to the axis Y1.

Then, the table 40 rotates by a certain angle and angularly moves the aforementioned station MC1 to a point where it is loaded (FIG. 4) with stiffening strips 110. An anthropomorphic robot deposits them on the suction cups 32 of the organ 30.

It is understood that the strips 110 are kept suspended at some distance from the upper platform 10 and oriented parallel to the axis X1.

Figure 5:
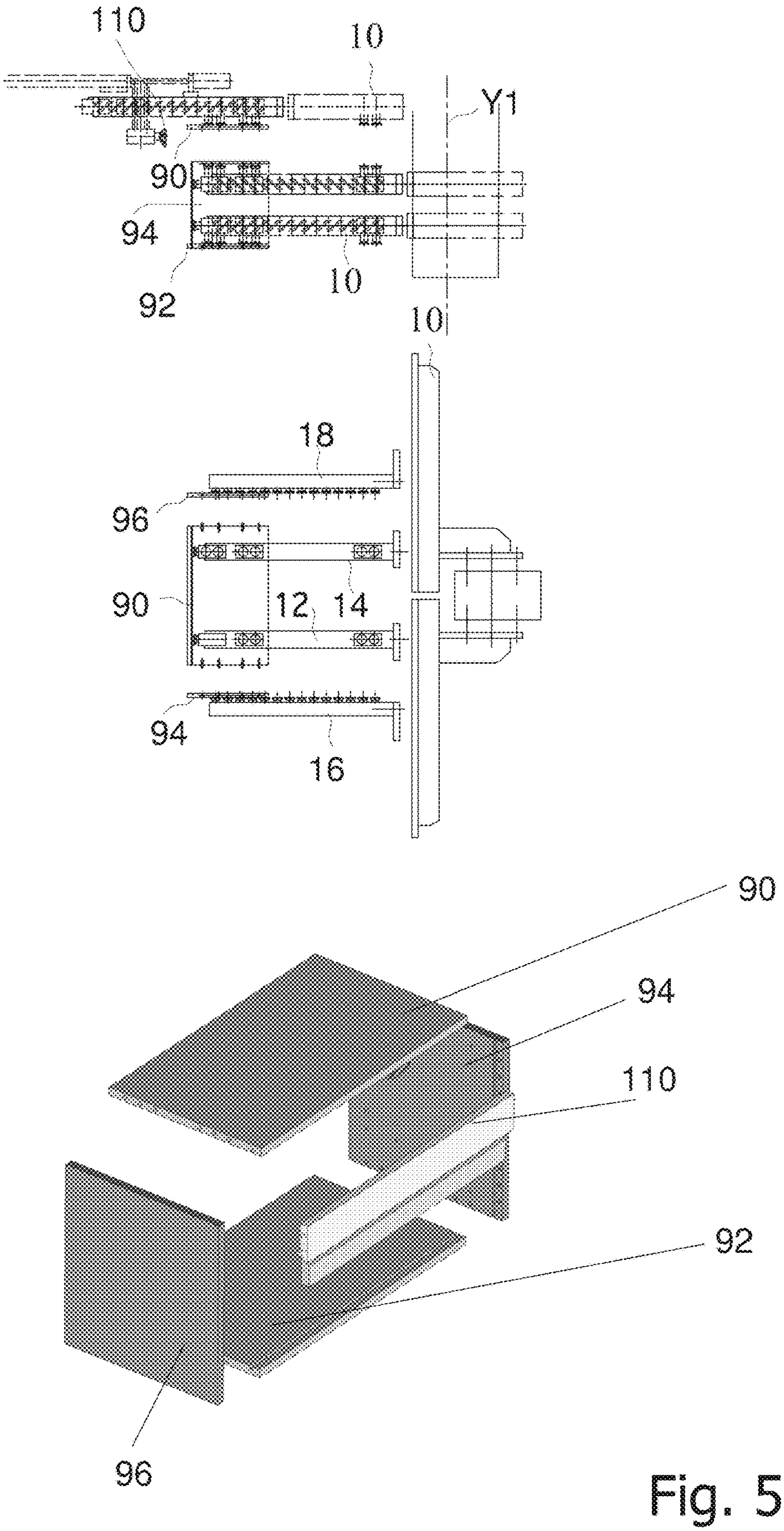
Figure 6:
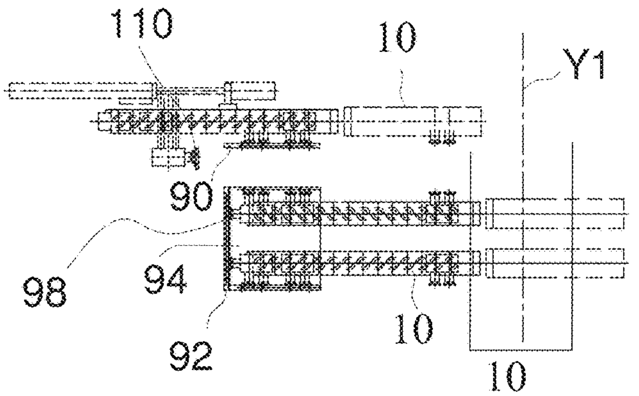
Figure 6:
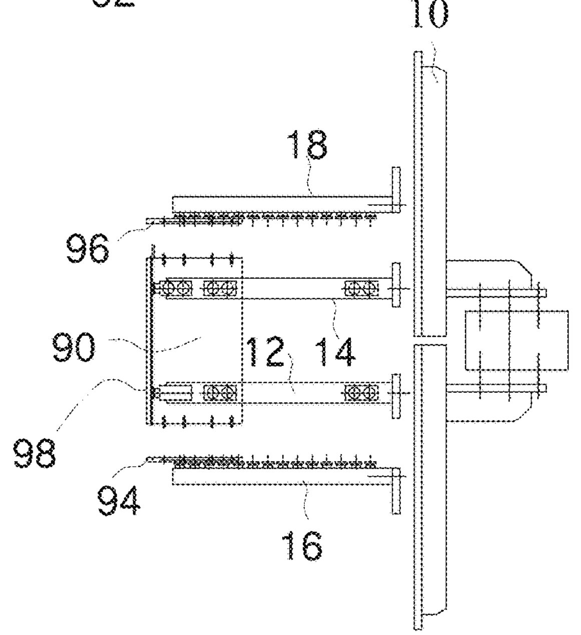
Figure 6:
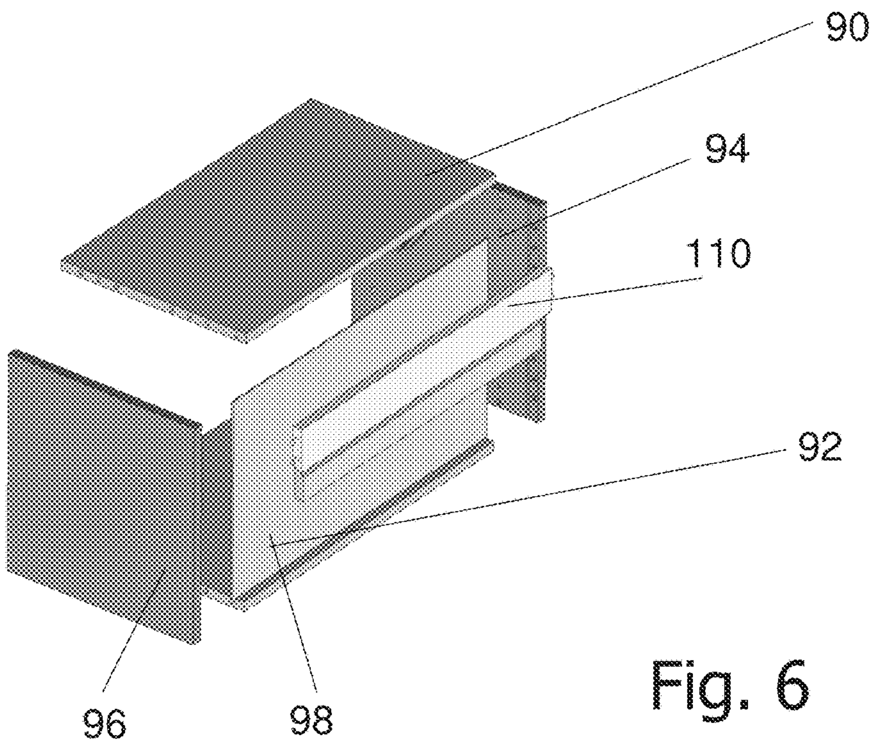

Then the table 40 rotates by a certain angle and angularly moves said station MC1 to a point where it is loaded with panels 94 and 96 by a robot (FIG. 5).

The panel 94 is attached to the suction cups 22 on the inner side of the arms 16 of the lower and upper platform 10, while the panel 96 is attached—mirror-like—to the suction cups 22 on the inner side of the arms 18 of the lower and upper platform 10.

It is understood that the arms 16, 18 of the upper and lower platforms 10 maintain the panels 94, 96 parallel to each other, spaced apart from each other, orthogonal to the panels 90, 92 and with their edges aligned along a direction parallel to the axis X1.

The arms 16, 18 of the upper and lower platform 10 are previously adjusted along the axis X1 to the correct relative distance, adapted to the size of the panels 90, 92. The position of the upper and lower platform 10 is also pre-adjusted along the axis Y1 to the correct relative distance, adapted to the size of the panels 94, 96.

Then the table 40 rotates by a certain angle and angularly moves the aforementioned station MC1 to a point where it is loaded (FIG. 6) with the panel 98 thanks to a robot that deposits it on the suction cups 24.

It is understood the panel 98 remains hanging from the arms 12, 14, and is kept orthogonal to both the arms 12, 14 and both the panels 90, 92, 94, 96 by remaining in a position in front of the panels 90, 92, 94, 96 and in contact with the edges of the panels 90, 92, 94, 96.

Figure 7:
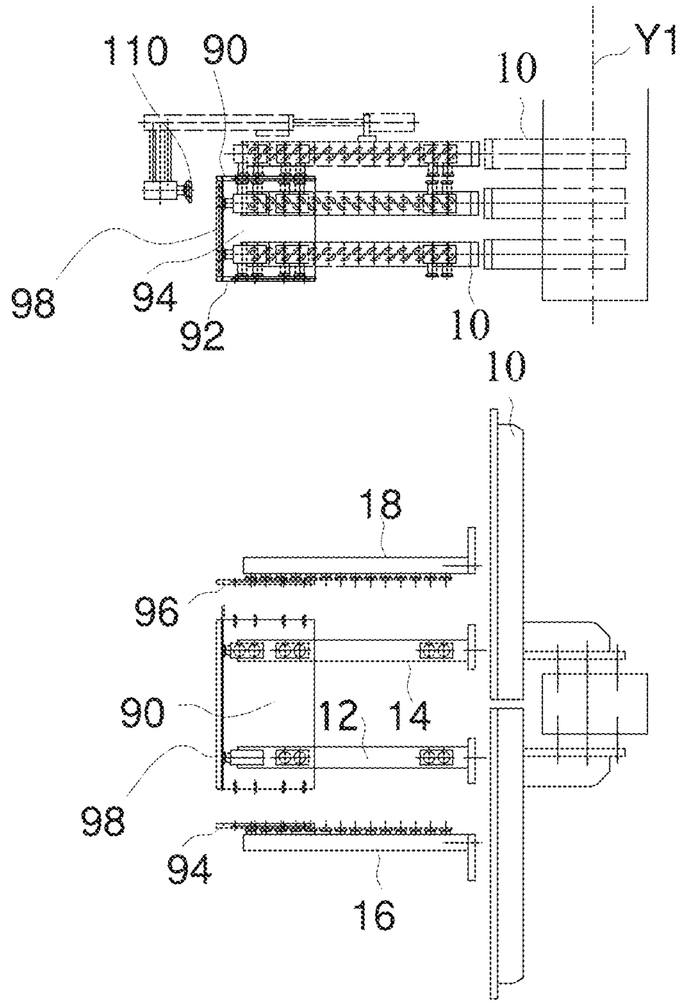

Then, the table 40 rotates by a certain angle and angularly moves the aforementioned station MC1 to a point where no other material is loaded but the closing of the cabinet is performed, e.g. according to the sequence below:

1. Closing of the Panel 90 (FIG. 7).

The upper platform 10 is moved along Y1 by bringing it closer to the lower platform 10, such that the distance between the upper platform 10 and the lower platform 10 is approximately equal to the length along Y1 of the panels 94, 96.

Figure 8:
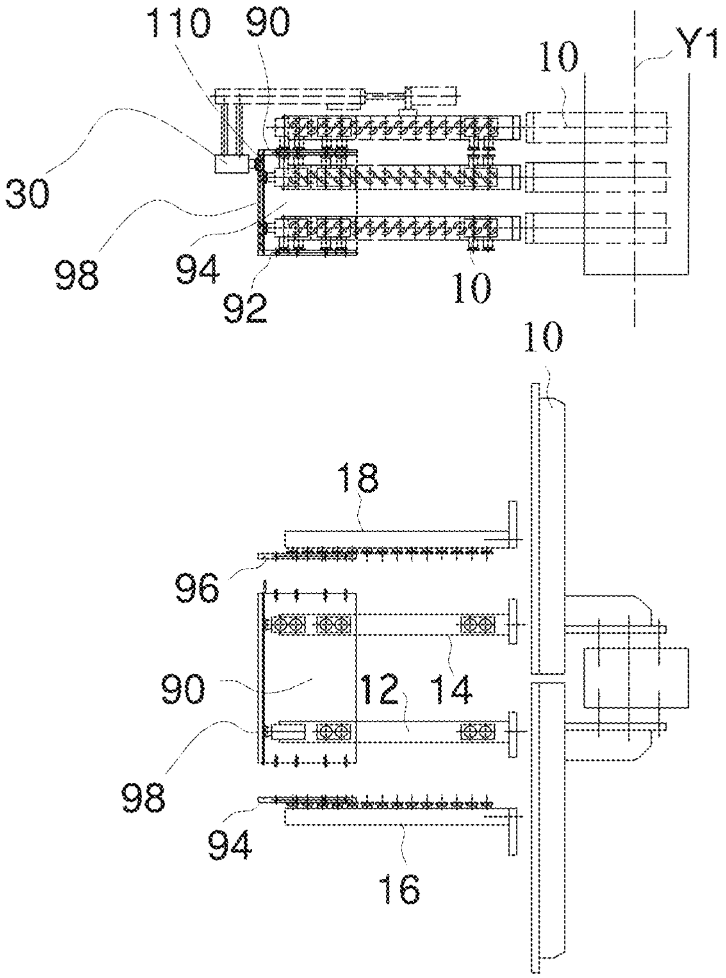

2. Positioning the Reinforcement Strips (FIG. 8).

Figure 9:
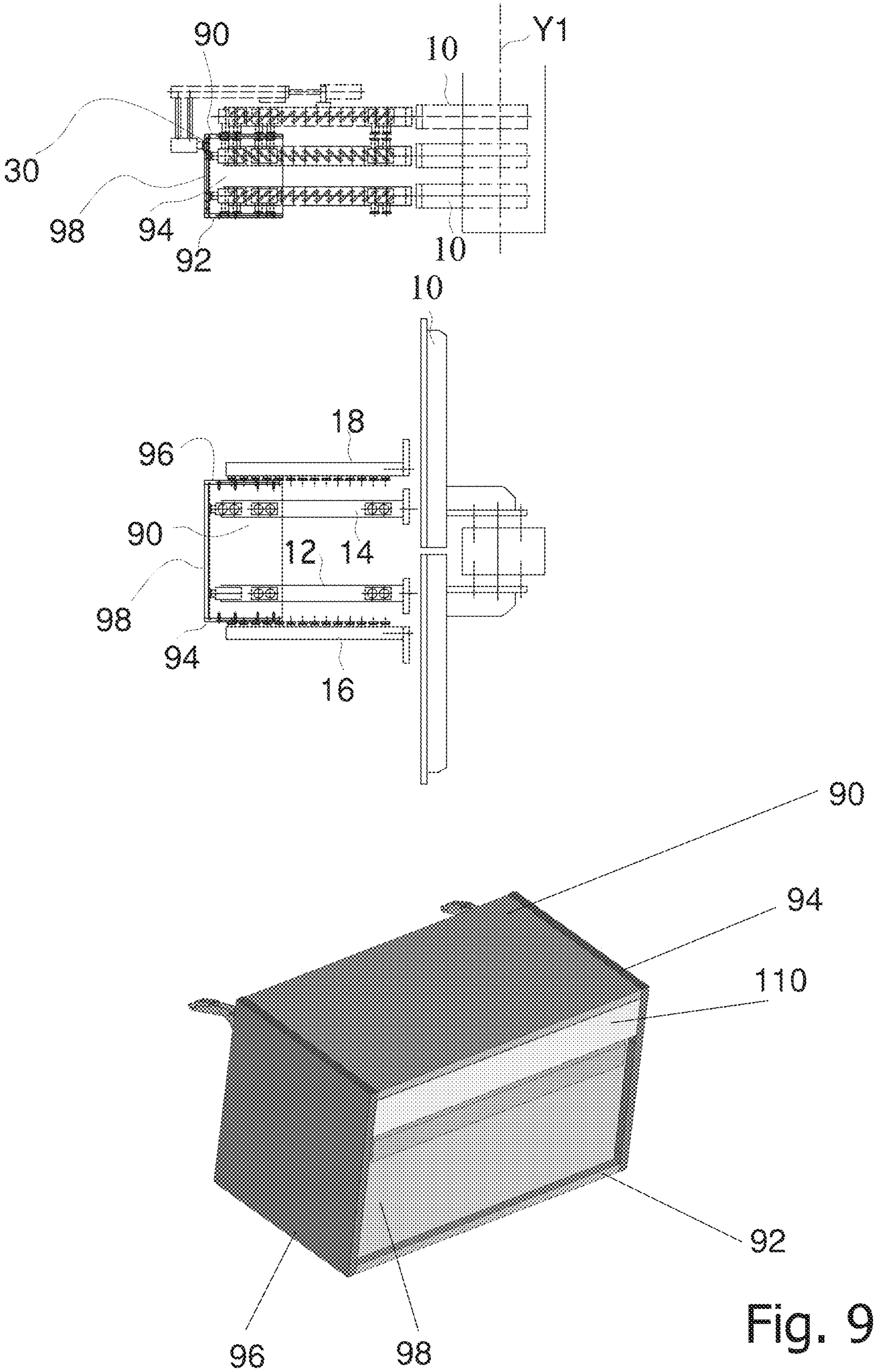

The organ 30 is moved along Z1 to bring the strip into contact with the surface of the panel 98, 3. Closing of Panels 94, 96 (FIG. 9).

The arms 16, 18 of the upper and lower platforms 10 are moved along X1 by bringing them closer together so that the distance between the arms 16, 18 is approximately equal to the length along X1 of the panels 90, 92.

After these operations, the panels 90, 92, 94, 96, 98 are in the relative position that makes up the (compartment of the) cabinet, and corresponding to the final position of the assembled cabinet.

After the closing, the panels 90, 92, 94, 96, 98 are secured to each other by a stapling and/or gluing and/or screwing operation using, for example, an anthropomorphic robot.

Then comes the (optional) step of drilling the bottom surface of the panel 92 for mounting feet, e.g. made by means of a dedicated drilling unit.

Once these finishing operations have been completed, the table 40 rotates by a certain angle and moves angularly the above-mentioned station MC1. At the sixth and last angular position, automatic nailing of lower protective battens is performed.

Then a manipulator unloads the assembled cabinet from the unit MC1 and releases it for a new cycle.

The movements of the various elements of the machine or unit MC1 or MC2 are carried out by means of known drives.

The number of platforms 10 and/or the size of the platforms 10 in the machine MC1 or MC2 may vary according to the size of the panels: the larger the panels, the more platforms it is convenient to use, in order to stabilize the transported panels.

Machine variants having more than two platforms 10 allow the structural complexity of the manufactured cabinet to be increased. E.g. the machines MC1, MC2 are illustrated in a variant having three platforms 10: one upper platform 10*a*, a middle platform 10*b*, and one lower platform 10*c*, see FIG. 1.

Platforms 10*a*, 10*c* function as explained above for the machines MC1 and MC2. Platform 10*b*, on the other hand, serves to receive and hold a panel 99 (shown for simplicity only in FIG. 3) that will form a shelf or bracket inside the assembled box-shaped shell.

Figure 3:
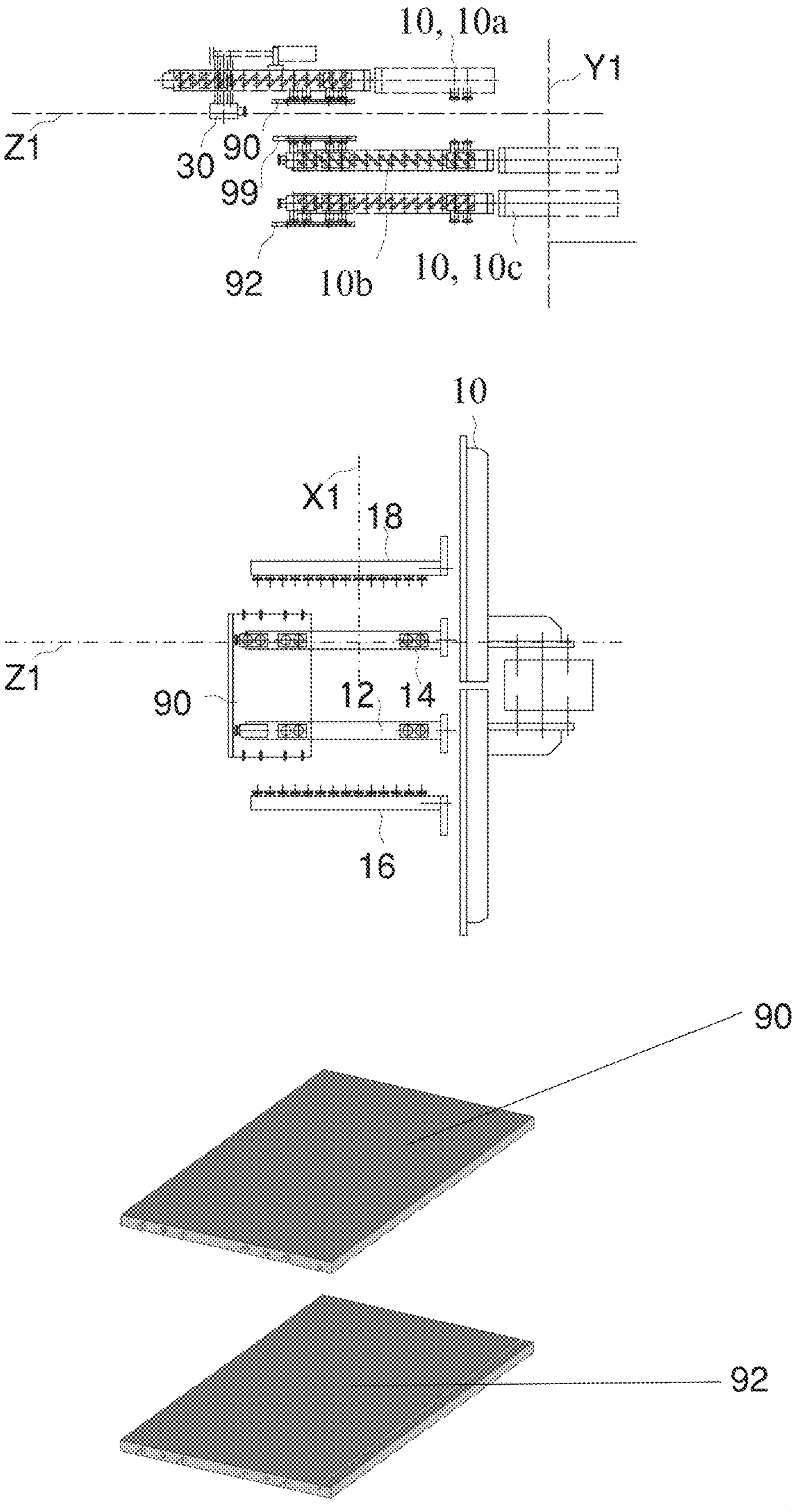
FIGS. 3-9 show a sequence of cabinet assembly achievable with the machine.
Figure 4:
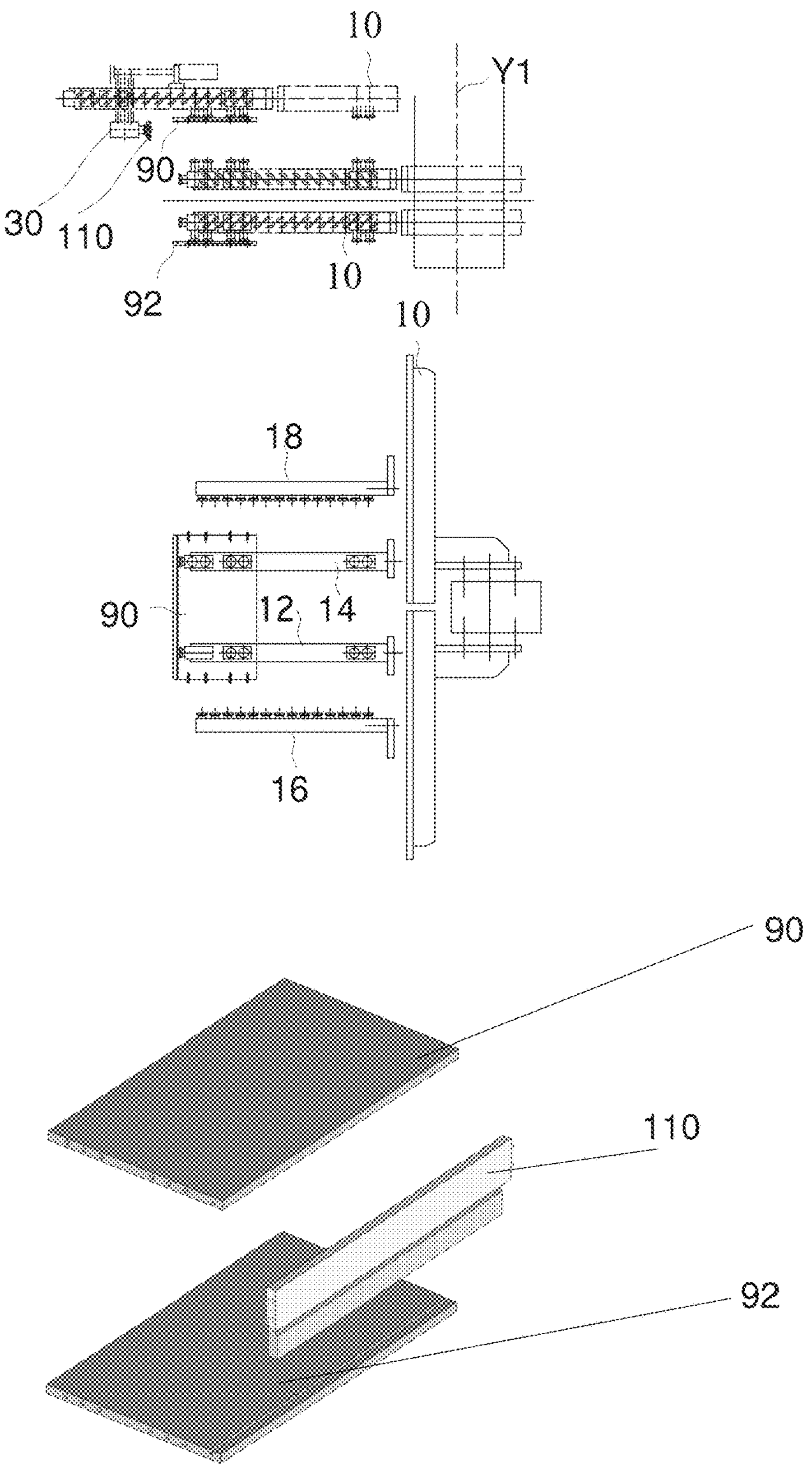

Clearly, see e.g. FIG. 3, the platform 10*b* can be loaded with a panel 99 that remains parallel—and aligned with respect—to the panels 90, 92. In the various successive steps shown in FIGS. 3-9, the platform 10*b* is configured to hold the panel 99 suspended between the panels 90, 92, 94, 96, 98, so that after the final assembly step (see FIGS. 7-9) the panel 99 ends up inside the assembled box-shaped shell and forms a horizontal shelf thereof.

The loading of the panel 99 onto the platform 10*b* may also occur at a different step than the one shown.

Note that, as an alternative or addition to the panel 99, a panel disposed orthogonally to the panels 90, 92 (i.e. parallel to the lying planes of the panels 94, 96) may also be loaded on the platform 10*b* to form in the assembled box-shaped shell an internal partition septum that is vertical in use.

More than one panel 99 can also be loaded, to have multiple horizontal internal partitions in the cabinet, ditto for vertical partitions.

The invention claimed is:

1. Method for producing by means of a machine an assembled furniture item, or an assembled portion of a furniture item such as a drawer or a box-shaped casing, from individual panels, comprising the steps of holding a first and second panel so that these panels are spaced apart and parallel to each other;

holding a third and fourth panel, in close proximity to the first and second panels, so that the third and fourth panels are spaced apart, parallel to each other, and on planes orthogonal to the lying planes of the first and second panels, and then holding the panels so that they form in exploded view a drawer structure or a box-shaped casing, and then bringing the panels toward a same imaginary point located inside the space surrounded by the panels so that the edges of the first, second, third, and fourth panels end up in mutual contact, to form the drawer or box-shaped casing.

2. Method according to claim 1, wherein a fifth panel is held such that the latter is in close proximity to, and on a plane orthogonal to the lying planes of, the first, second, third and fourth panels, and the fifth panel is moved toward the other panels so that the edges of the fifth panel end up or are in contact with the edges of the first, second, third, and fourth panels thereby forming the drawer or box-shaped casing.

3. Method according to claim 2, further comprising a step of moving the first, second, third, fourth, and fifth panels, so that they converge to said common point to form the drawer or box-shaped casing.

4. Method according to claim 1, wherein said same imaginary point is a center of gravity of an assembled drawer structure or a box-shaped casing.

5. Machine for producing an assembled furniture item, or an assembled portion of furniture item such as a drawer or a box-shaped casing, starting from individual panels according to the method of claim 1, comprising:

a first and second panel support which are mounted linearly movable along a first displacement direction, and comprise means—or are configured—for holding a first and second panel so that such panels stay spaced apart and parallel to each other;

a third and fourth panel support, which are mounted linearly movable along a second displacement direction that is parallel to a plane orthogonal to the first direction, and comprise means or being configured for holding a third and fourth panel so that such panels stay spaced apart, parallel to each other, and in close proximity to, and on planes orthogonal to the lying planes of, the first and second panels;

wherein the first, second, third and fourth panel support comprises two arms that are:

parallel to each other, lying on a plane orthogonal to the respective displacement direction, and equipped with said means for holding, or configured for holding, the respective panels;

a control unit configured for controlling a displacement of the supports so as to move the first and/or second support along the first direction, and/or move along the second direction the third and/or fourth support so that the edges of the first, second, third and fourth panel end up being in mutual contact and converge to a common point to form the drawer or box-shaped casing.

6. Machine according to claim 5, wherein the first and second panel supports are linearly movable along a same axis.

7. Machine according to claim 5, comprising means or a support for holding a fifth panel so that the latter stays on a plane orthogonal to the lying planes of the first, second, third and fourth panels, and the control unit is configured for controlling the means or support for holding the fifth panel so that the edges of the fifth panel end up in contact or stay in contact with the edges of the first, second, third, and fourth panels thereby forming the drawer or box-shaped casing.

8. Machine according to claim 5, wherein said two arms are translatable within their lying plane while remaining always parallel to each other.

9. Machine according to claim 5, comprising two platforms that are movable along a same direction while remaining parallel to each other, and each equipped with two center arms and two outer arms, the arms being parallel to each other and preferably substantially coplanar, set side by side to form a four-pronged fork, and movable independently, being able to approach or move away from each other while always remaining parallel to each other.

10. Machine according to claim 5, comprising a table rotatable about a fourth axis, on the periphery of the table being installed with polar symmetry two or more panel-receiving units, each unit comprising said first, second, third and fourth panel support and preferably also the means for holding the fifth panel.

11. Machine according to claim 5, wherein the third and fourth panel supports are linearly movable along a same axis.

12. Machine according to claim 11, wherein the first and second panel supports are linearly movable along a same axis.

13. Machine according to claim 12, comprising means or a support for holding a fifth panel so that the latter stays on a plane orthogonal to the lying planes of the first, second, third and fourth panels, and the control unit is configured for controlling the means or support for holding the fifth panel so that the edges of the fifth panel end up in contact or stay in contact with the edges of the first, second, third, and fourth panels thereby forming the drawer or box-shaped casing.

14. Machine according to claim 5, wherein said two arms are mounted movable within their lying plane ad translatable within their lying plane while always remaining parallel to each other.

15. Machine according to claim 5, comprising three platforms that are movable along a same direction while remaining parallel to each other, and each equipped with two center arms and two outer arms, the arms being:

parallel to each other and substantially coplanar, set side by side to form a four-pronged fork, and movable independently, being able to get closer or move away from each other while always remaining parallel to each other.

16. Machine according to claim 15, wherein the two center arms comprise means or are being configured for holding the first and second panels so that these panels stay spaced apart and parallel to each other;

and the two outer arms comprises means or are being configured for holding the third and fourth panels so that such panels stay spaced apart, and parallel to each other, and on planes orthogonal to the first and second panel lying planes.

17. Machine according to claim 15, wherein the means for holding are mounted on the center arms of each platform so as to face each other.

18. Machine according to claim 15, wherein the means for holding are mounted on the outer arms of each platform so as to face each other.

19. Method according to claim 1, further comprising a step of translating only linearly the first and/or second panel and/or third and/or fourth panel so that the edges of the first, second, third and fourth panels end up contacting each other thereby forming the drawer or box-shaped casing.

20. Method according to claim 1, wherein a sixth panel is held so that the latter, during the assembly steps, stays between the first and second panel and/or between the third and fourth panel, on a plane parallel to the lying planes of the first and second panel or the lying planes of the third and fourth panel, and aligned with the first and second panel or aligned with the third and fourth panel.

* * * * *